United States Patent Office 3,637,824
Patented Jan. 25, 1972

---

3,637,824
3-(N-METHYL)-LOWERALKANOYLAMIDO-5-AMINO-2,4,6-TRIIODOBENZOIC ACIDS
Hugo Holtermann, Baerum, Leif Gunnar Haugen, Oslo, and Knut Wille, Baerum, Norway, assignors to Nyegaard & Co. A/S, Oslo, Norway
No Drawing. Original application Dec. 8, 1960, Ser. No. 74,485, now Patent No. 3,476,802, dated Nov. 4, 1969. Divided and this application July 18, 1969, Ser. No. 843,179
Claims priority, application Norway, Nov. 17, 1960, 138,044
Int. Cl. C07c *103/32*
U.S. Cl. 260—518 A
2 Claims

ABSTRACT OF THE DISCLOSURE

There are provided 3-(N-methyl)-loweralkanoylamido-5-amino-2,4,6-triiodobenzoic acids, particularly the 3-(N-methyl)-acetamido-compound. These compounds are valuable intermediates for the preparation of 3-(N-methyl)-loweralkanoylamido-5-lower alkanoylamido-2,4,6-triiodobenzoic acids which are useful as X-ray contrast agents.

---

The present application is a division of copending application Ser. No. 74,485, now Pat. No. 3,476,802 filed Dec. 8, 1960.

This invention relates to novel derivatives of 3,5-diamino-2,4,6-triiodobenzoic acid.

Water-soluble inorganic and organic salts of 3,5-diacetamido-2,4,6-triiodobenzoic acid have been used as X-ray contrast agents, because they are water-soluble and relatively non-toxic, while at the same time, on account of their high content of iodine, they are impervious to X-rays.

As early as 1896 Lutgens (Berichte 29, 2835) prepared 3,5-diamino-2,4,6-triiodobenzoic acid by iodinating 3,5-diaminobenzoic acid. 3,5 - diamino - 2,4,6 - triiodobenzoic acid is, however, a rather unstable compound and has therefore proved unsuitable as X-ray contrast agent but acetylation of this compound (Am. Chem. Soc. 126 Meeting, New York, Sept. 6, 1954—Abstracts p. 11–N; Larsen et al., Am. Soc. 78 (1956); Norwegian Pat. No. 87963) yields 3,5-diacetamido-2,4,6-triiodobenzoic acid which is more stable.

A number of salts of the N-mono-alkyl-3,5-diacylamino-2,4,6-triiodobenzoic acids, in particular the N-methyl compound, are of unexpectedly high water-solubility and, being of low toxicity, are especially suitable as vascular X-ray contrast agents.

It is an object of the present invention therefore to provide novel intermediates for the production of N-lower alkyl derivatives of 3,5-diacylamino-2,4,6-triiodobenzoic acids.

According to the present invention therefore there are provided intermediates for the preparation of compounds of the general formula

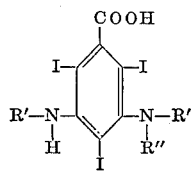

in which the groups R', which may be the same or different are acyl groups and R″ is methyl.

The N-alkyl-3,5-diacetamido-2,4,6-triiodobenzoic acids may be prepared from 3-acylamino-5-amino-2,4,6-triiodobenzoic acids, the preparation of which is disclosed by the aforementioned publication of Larsen et al. in the Journal of the American Chemical Society, 78, 3210–3216, in two steps, 3-acylamino-5-amino-2,4,6-triiodobenzoic acid being alkylated to 3-(N-alkyl)-acylamino-5-amino-2,4,6-triiodobenzoic acids, the compounds of the present invention, followed by acetylation of the latter compound to the required N-alkyl-3,5-diacylamino-2,4,6-triiodobenzoic acid according to the following formulae:

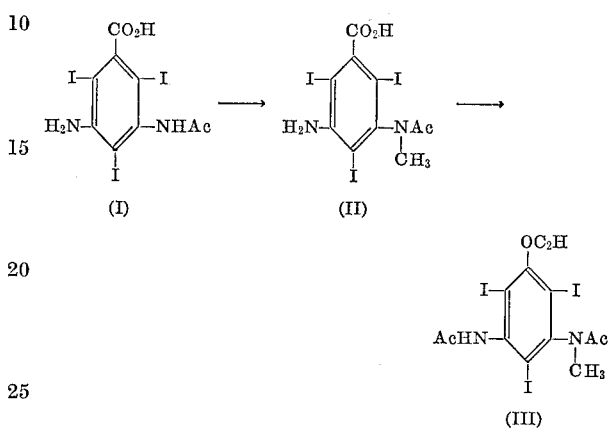

The alkylation may be carried out, for example, in alkaline aqueous solution by means of an alkylating agent, preferably at room temperature with an excess of dialkyl sulphate dissolved in acetone, the amount of alkylating agent, preferably chosen so as to exactly consume all starting material under the actual conditions of the synthesis, this amount being assessed by adding dimethyl sulphate until little or no starting material is found in the reaction mixture when this is applied to paper chromatography. Since the N-monomethyl derivative is a preferred compound according to the invention, the above process is preferably effected by a methylating agent.

Small amounts of alkyl ester of the 3-(N-alkyl)-acylamido-5-amino-2,4,6-triiodobenzoic acid may be formed, especially if a too large excess of alkylating agent is being used or if the reaction mixture is inhomogeneous during alkylation, e.g. by using too little solvent. The ester, however, can easily by converted into the acid by lysis, e.g. by alkaline hydrolysis or by aminolysis.

The acylation step may be carried out by means of an acid anhydride e.g. acetic anhydride in the presence of a strong acid, e.g. concentrated sulphuric acid or perchloric acid, as catalyst. Thus, a smooth, exothermic reaction takes place when 3 - (N-methyl)-acetamido-5-amino-2,4,6-triiodobenzoic acid is covered with an excess of acetic anhydride, gently heated and a catalytic amount of concentrated sulphuric acid added. The required new compound, N-methyl-3,5-diacetamido-2,4,6-triiodobenzoic acid separates as a colorless product when the reaction mixture adopts room temperature. Further amounts of reaction product can be collected on concentrating the mother liquor, preferably in vacuo. If ester eventually formed during the methylating step has not been separated, e.g. by addition of weak alkali in which it is insoluble, a small amount of the methyl ester of N-methyl-3,5-diacetamido-2,4,6-triiodobenzoic acid can be separated from the acylation mixture by means of its insolubility in weak alkali, and eventually be converted to the required acid by lysis, e.g. hydrolysis or aminolysis.

Of the new compounds which can be produced according to the invention N-alkyl, in particular N-methyl-3,5-diacetamido-2,4,6-triiodobenzoic acids have proved to be promising contrast agents, the sodium salts of these acids having high iodine content, a high degree of solubility in water, low toxicity, and rapid and high secretion through the kidneys.

A compound of particular interest which may be prepared using a novel intermediate of the present invention is N-methyl-3,5-diacetamido - 2,4,6 - triiodobenzoic acid, which has a high iodine content and low toxicity and further possesses the important advantage that its water-soluble salts, in particular the sodium salt, possess unexpectedly higher water-solubility than the corresponding salts of the known 3,5-diacetamido-2,4,6-triiodobenzoic acid. Thus for example the sodium salt of this new compound has a solubility in water at room temperature of 80–85 percent weight/volume, the viscosity of the saturated solution being low. The solubility of the sodium salts is of especial importance, because they combine the properties of low toxicity, low molecular weights, high iodine contents and low viscosity of their aqueous solutions. The methylglucamine and diethanolamine salts are also of particular utility. Furthermore, super-saturated (100 percent weight/volume) autoclaved solutions have been prepared which have remained stable, without any sign of crystallization as yet for an observation period of six months. The low tendency of crystallization may be supported by the acid being able to exist in two isomeric geometric forms, the equilibrium of which is reached after short heating above 50° C., the two forms being present at equilibrium in a ratio of about 15:85.

The unexpected solubility properties of the compound may be further stressed by pointing to the fact that the sodium salt of the further methylated compound, sodium N,N' - dimethyl-3,5-diacetamido-2,4,6-triiodobenzoate, is considerably less soluble (solubility about 17 percent in water at room temperature) than the known sodium 3,5-diacetamido-2,4,6-triiodobenzoate, the sodium salt of the new N-methyl-3,5-diacetamido-2,4,6-triiodobenzoic acid thus being the most soluble sodium salt among these substances.

In order that the invention may be well understood we give the following examples by way of illustration only.

EXAMPLE 1

3-acetamido-5-amino-2,4,6-triiodobenzoic acid (2 g.) was suspended in 2 ml. of water and dissolved by adding 2.6 ml. of 5 N KOH. Dimethyl sulphate (0.6 ml.; 1.82 eqv.) dissolved in acetone (0.8 ml.) was added in portions with stirring. After a few minutes the solution became homogeneous. Stirring was continued for 1 hour after which dilute hydrochloric acid (1:1) was added to pH about 0.5, the precipitate filtered, washed with water and dried in vacuo. 3-(N-methyl)-acetamido-5-amino-2,4,6-triiodobenzoic acid (2.0 g.; 97%) was collected as a colorless powder, M.P. 275° C. This product (1.0 g.) was suspended in acetic anhydride (2.5 ml.) and warmed gently whereafter one drop of concentrated sulphuric acid was added. The mixture became transiently clear and was boiled for about 2 minutes whereby about half of the acetic anhydride distilled off. After the mixture had adopted room temperature the crystallized material was filtered, washed with little acetic anhydride, suspended in water (about 5 ml.) and concentrated ammonia added to strongly alkaline reaction and the mixture heated to boiling. About 50 mg. of insoluble methyl N-methyl-3,5-diacetamido-2,4,6-triiodobenzoate remained on the filter, and concentrated hydrochloric acid was added to the filtrate whereby N - methyl-3,5-diacetamido-2,4,6-triiodobenzoic acid precipitated, weighing 0.9 g. (about 84%, M.P. 265° C., I=60.9% (61.5; 60.3%), calc. 60.65%; N=4.45% (4.47; 4.43%), calc. 4.46%) after washing with water and drying in vacuo. A further quantity of the same substance could be recovered on concentration of the mother liquors.

EXAMPLE 2

Methyl N-methyl-3,5-diacetamido-2,4,6-triiodobenzoate (9 g.) was suspended in 3 N KOH (9 ml.) and water (19 ml.) added. To the mixture was added N-dimethylaminoethanol (2 ml.; about 1.4 eqv.) and heated in the boiling water bath. The ester dissolved rapidly and the reaction was completed after 2½ hours. Then the solution was diluted with water to about 70 ml. and acidified by means of concentrated hydrochloric acid to pH about 0.5. After being filtered, washed with water and dried the N-methyl-3,5-diacetamido-2,4,6-triiodobenzoic acid weighed 6.6 g. (75%).

EXAMPLE 3

Methyl 3-(N-methyl)-acetamido-5-amino-2,4,6-triiodobenzoate was aminolysed as described in Example 2 and worked up in the same way yielding 3-(N-methyl)-acetamido-5-amino-2,4,6-triiodobenzoic acid.

We claim:
1. 3-(N-methyl)-acetamido - 5 - amino-2,4,6-triiodobenzoic acid.
2. A compound of the formula

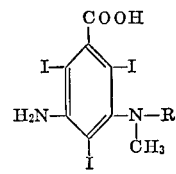

wherein R is lower alkanoyl.

References Cited

UNITED STATES PATENTS 3,004,964   10/1961   Wiegert _____ 260—518 A

LORRAINE A. WEINBERGER, Primary Examiner

L. ARNOLD THAXTON, Assistant Examiner

U.S. Cl. X.R.

260—471 R; 424—5